(12) United States Patent
Najafi et al.

(10) Patent No.: US 10,532,943 B2
(45) Date of Patent: Jan. 14, 2020

(54) GYROSCOPE AND FABRICATION PROCESS

(71) Applicant: THE REGENTS OF THE UNIVERSITY OF MICHIGAN, Ann Arbor, MI (US)

(72) Inventors: Khalil Najafi, Ann Arbor, MI (US); Jae Yoong Cho, Ann Arbor, MI (US); Ali Darvishian, Ann Arbor, MI (US); Guohong He, Ann Arbor, MI (US); Behrouz Shiari, Ann Arbor, MI (US); Tal Nagourney, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 137 days.

(21) Appl. No.: 15/444,450

(22) Filed: Feb. 28, 2017

(65) Prior Publication Data
US 2017/0248422 A1   Aug. 31, 2017

Related U.S. Application Data

(60) Provisional application No. 62/301,066, filed on Feb. 29, 2016.

(51) Int. Cl.
*G01C 19/5691* (2012.01)
*G01C 19/567* (2012.01)
*C03B 23/025* (2006.01)

(52) U.S. Cl.
CPC ........ *C03B 23/0252* (2013.01); *G01C 19/567* (2013.01); *G01C 19/5691* (2013.01)

(58) Field of Classification Search
CPC ... G01C 19/5691; G01C 19/567; G01C 19/56
See application file for complete search history.

(56) References Cited

U.S. PATENT DOCUMENTS

| 4,951,508 A | 8/1990 | Loper, Jr. et al. |
| 6,474,161 B1 * | 11/2002 | Jeanroy ............. G01C 19/5691 73/504.13 |
| 7,036,373 B2 | 5/2006 | Johnson et al. |
| 7,040,164 B2 | 5/2006 | Painter et al. |
| 8,631,702 B2 | 1/2014 | Horning et al. |
| 9,494,425 B2 | 11/2016 | Najafi et al. |

(Continued)

OTHER PUBLICATIONS

S. A. Zotov, et al "3-D Micromachined Spherical Shell resonators With Integrated Electromagnetic and Electrostatic Transducers." Solid-state sensors, actuators, and microsystems workshop (2010).

(Continued)

*Primary Examiner* — Herbert K Roberts
(74) *Attorney, Agent, or Firm* — Harness, Dickey & Pierce, P.L.C.

(57) ABSTRACT

Gyroscopes are sensors that measure angular rate and angular orientation. A three-dimensional fused silica micro shell rate-integrating gyroscope is presented. One aspect of the gyroscope includes the use of optical sensors to detect motion of the resonator. The proposed gyroscope is attractive because it achieves several magnitudes higher accuracy as well as high vibration and shock insensitivity from a novel resonator design as well as other unique manufacturing processes.

15 Claims, 10 Drawing Sheets

(56) References Cited

U.S. PATENT DOCUMENTS

| | | | | |
|---|---|---|---|---|
| 2009/0282915 A1* | 11/2009 | Ohta | ............... | B81B 7/0058 |
| | | | | 73/504.12 |
| 2011/0239763 A1* | 10/2011 | Shkel | ............ | G01C 19/5691 |
| | | | | 73/504.13 |
| 2012/0144917 A1 | 6/2012 | Painter | | |
| 2013/0105921 A1 | 5/2013 | Najafi et al. | | |
| 2013/0327146 A1* | 12/2013 | Meyer | .............. | G01P 15/093 |
| | | | | 73/514.27 |
| 2016/0194200 A1 | 7/2016 | Najafi et al. | | |
| 2016/0344368 A1* | 11/2016 | Ayazi | ............. | H03H 3/0072 |

OTHER PUBLICATIONS

J.Y. Cho, et al "A High-Q All-Fused Silica Solid-Stem Wineglass Hemispherical Resonator Formed Using Micro Blow Torching and Welding", Micro Electro Mechanical Systems (MEMS), 2015 28th IEEE International Conference on IEEE, (2015).

A. Darvishian et al "Investigation of Thermoelastic Loss Mechanism in Shell Resonators" ASME 2014 International Mechanical Engineering Congress and Exposition, American Society of oMechanical Engineers (2014).

* cited by examiner

GYROSCOPE AND FABRICATION PROCESS

CROSS-REFERENCE TO RELATED APPLICATIONS

This application claims the benefit of U.S. Provisional Application No. 62/301,066 filed on Feb. 28, 2016. The entire disclosure of the above application is incorporated herein by reference.

FIELD

The present disclosure relates to a gyroscope and its fabrication process.

BACKGROUND

Gyroscopes are sensors that measure angular rate and angular orientation. Gyroscopes are being adopted in many applications including consumer electronics, machines, robots, automotive, vessels, and airplanes, and space satellites. Recent advance in micro electromechanical system (MEMS) technology allowed the manufacturing of micro scale gyroscopes at low cost with sufficient accuracy. They are very useful for applications such as game controllers or smart phones as well as stabilization of cameras, factory machines, and cars.

However, accuracy of current micro gyroscopes cannot meet the requirements of many other applications. Examples of those include the navigation of humans, autonomous cars, and drones in regions where no GPS signal is available. Navigation requires precise accurate position sensing, which is highly difficult. This is because an error in the position calculated by inertial sensors grows nearly exponentially with time. Stabilization of cameras, cars, or machines require only rotation rate data, whose error does not grow over time. Therefore, navigational applications require a micro gyroscope with several orders of magnitude higher accuracy than stabilization applications.

This section provides background information related to the present disclosure which is not necessarily prior art.

SUMMARY

This section provides a general summary of the disclosure, and is not a comprehensive disclosure of its full scope or all of its features.

A three-dimensional micro shell rate-integrating gyroscope is presented. The gyroscope includes: a support substrate; an inner shell attached to the substrate; and a resonator disposed in the inner cavity and mounted on the top surface of the support substrate. The inner shell and defines an inner cavity between an interior surface of the inner shell and a top surface of the support substrate. Two or more driving electrodes are formed on the support substrate and are arranged around periphery of the resonator. The two or more driving electrodes are configured to drive the resonator electrostatically. A plurality of optical sensors are integrated into the support structure, such that each optical sensor is configured to detect motion of the resonator.

In one example, the resonator has a hollow hemispherical shape with a first integral stem extending from a center of an inner surface of the resonator and attached to the support substrate. The resonator may also include a second integral stem extending from a center of an outer surface of the resonator and attached to the interior surface of the inner shell.

In one aspect, the resonator has a thickness with a minimum value proximate to a rim of the resonator, such that the thickness of the resonator increases from the minimum value to a maximum value at the center of the resonator and the rim of the resonator has a thickness larger than the minimum value.

In another aspect, the resonator has a conductive coating disposed on an exterior surface thereof and adjacent to rim of the resonator. The conductive coating may be patterned as a ring on the exterior surface and proximate to the rim of the resonator. Alternatively, the conductive coating may be patterned as a plurality of discrete electrodes disposed around a circumference of the resonator and proximate to the rim of the resonator, where each the plurality of discrete electrodes aligns with one of the two or more driving electrodes.

In some embodiments, the gyroscope is mounted onto a platform and the platform is enclosed by an outer shell. The platform is thermally isolated from the outer shell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

FIGS. 1A-1D depict an example of a three-dimensional micro shell rate-integrating gyroscope 10 (RIG) constructed in accordance with this disclosure. The gyroscope 10 is comprised of a support substrate 11; an inner shell 12; a resonator 13; two or more driving electrodes 14 and a plurality of optical sensors 15. Each of these components is further described below.

The inner shell 12 attaches to the substrate 11 and defines an inner cavity 19 between an interior surface of the inner shell 12 and a top surface of the support substrate 11. The resonator 13 is disposed in the inner cavity 19 and is mounted on the top surface of the support substrate 11. In some embodiments, the resonator 13 is encapsulated in a vacuum (e.g., pressure <50 mTorr). A high vacuum level is preferable for a resonator 13 to achieve a high mechanical quality factor (Q) by reducing squeeze film damping due to gas molecules.

In the example embodiment, the resonator 13 has a hollow hemispherical shape with a stem 21 for attachment. In this embodiment, the stem is received in a hole formed in an anchor support 20. The anchor support 20 is formed on the top surface of the support substrate 11. It is envisioned that the resonator 13 may be attached in other ways to the support substrate 11.

Figure 1A:
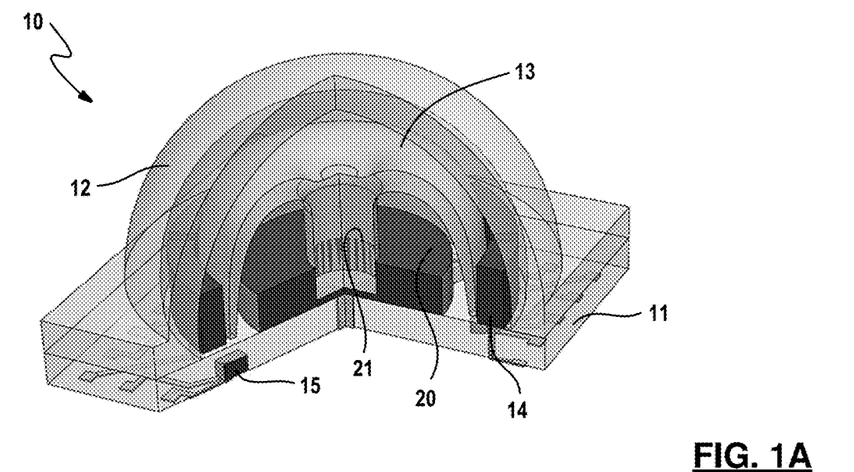
FIG. 1A is a perspective view with a partial cross section of a micro shell resonator rate-integrating gyroscope (RIG).
Figure 1B:
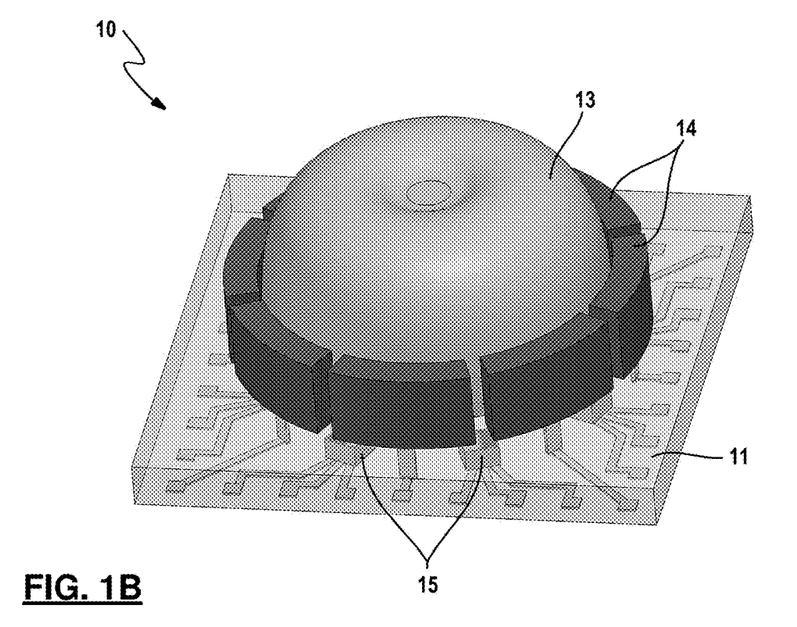
FIG. 1B is a perspective view with a partial cross section of a micro RIG without an outer shell.
Figure 1C:
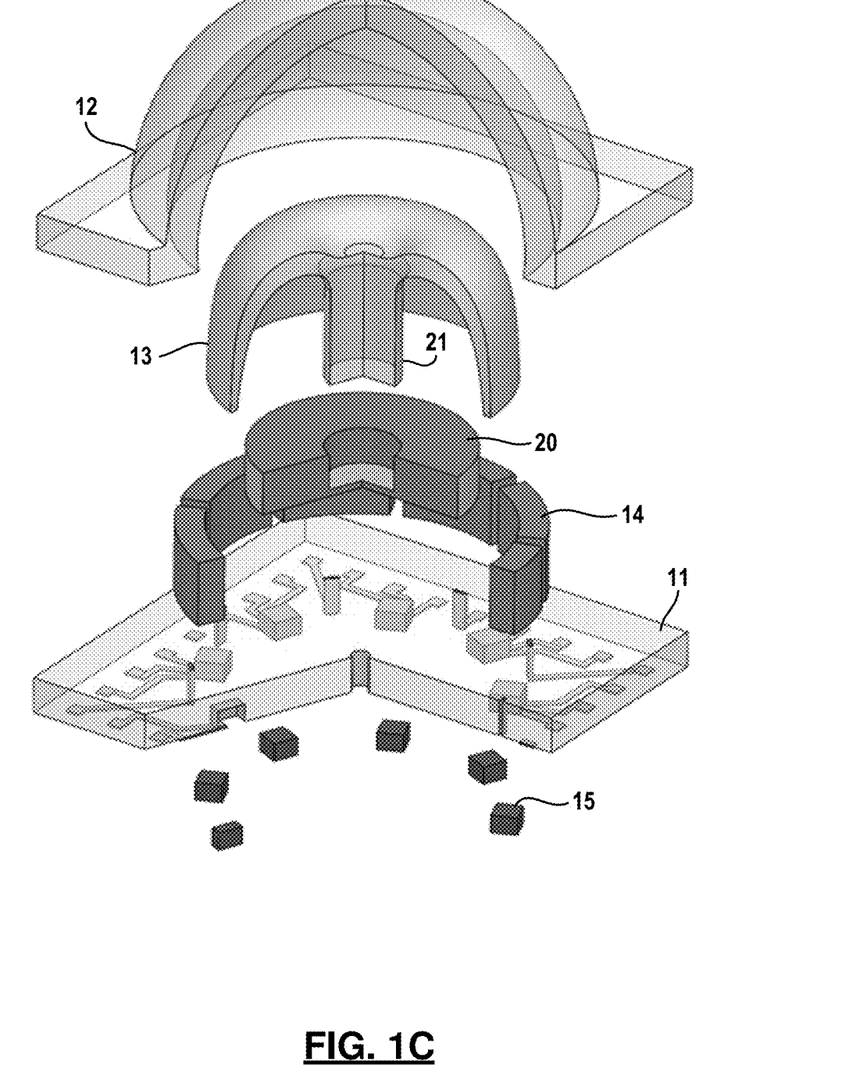
FIG. 1C is an exploded perspective view of the micro RIG.
Figure 1D:
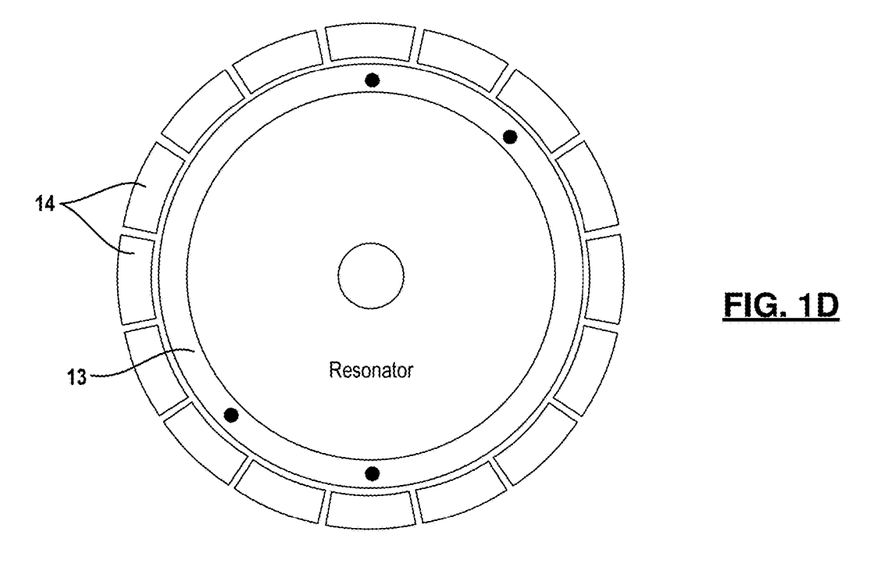
FIG. 1D is a cross section view of the micro RIG illustrating an arrangement for the drive electrodes.

Drive electrodes 14 are used to actuate the resonator, for example using electrostatic force. The drive electrodes 14 are formed on the support substrate 11 and arranged around periphery of the resonator 13 as seen in FIG. 1D. In the example embodiment, the drive electrodes 14 have a shape of an arc. The drive electrodes 14 are preferably located around the entire perimeter of the rim of the resonator 13 at a close distance (<100 μm) and spaced at equal angles from each other. Other arrangements for the drive electrodes 14 are contemplated by this disclosure.

The optical sensors 15 are configured to detect the motion of the resonator 13. Likewise, the optical sensors 15 are arranged around the periphery of the resonator 13 and may be integrated into the support structure. In the example embodiment, the optical sensors 15 are arranged around the entire perimeter of the rim of the resonator and positioned underneath the rim of the resonator 13. In one example, the optical sensors 15 are implemented by a single-mode laser diode and a photodetector mounted in a recess defined in the support substrate 11. Other arrangements for the optical sensors 15 are contemplated by this disclosure.

During operation, the gyroscope 10 operates by driving the resonator 13 in the flexural modes, also known as the wineglass modes at a constant amplitude. The oscillating pattern (or the standing wave pattern) is aligned to a constant orientation when the gyroscope 10 is not rotated. However, if the gyroscope is rotated along the yaw axis (=z-axis), the orientation of the standing wave pattern changes by an angle that is proportional to the angle of the rotation for the gyroscope. The angular change is detected by the optical sensors 15 and the rotational rate and/or rotational angle are calculated from the measured angular change.

The example described above is a gyroscope 10 that is driven electrostatically while the motion of the resonator 13 is sensed optically. Driving and sensing principles are not restricted to these two examples. For example, driving of the resonator can be done electromagnetically, piezoelectrically, opto-thermally, opto-mechanically, or thermally. Sensing of resonator motion can be done capacitively, electromagnetically, piezoelectrically, opto-mechanically, or thermally. Different combinations of the driving and sensing principles are contemplated by this disclosure.

Figure 2:
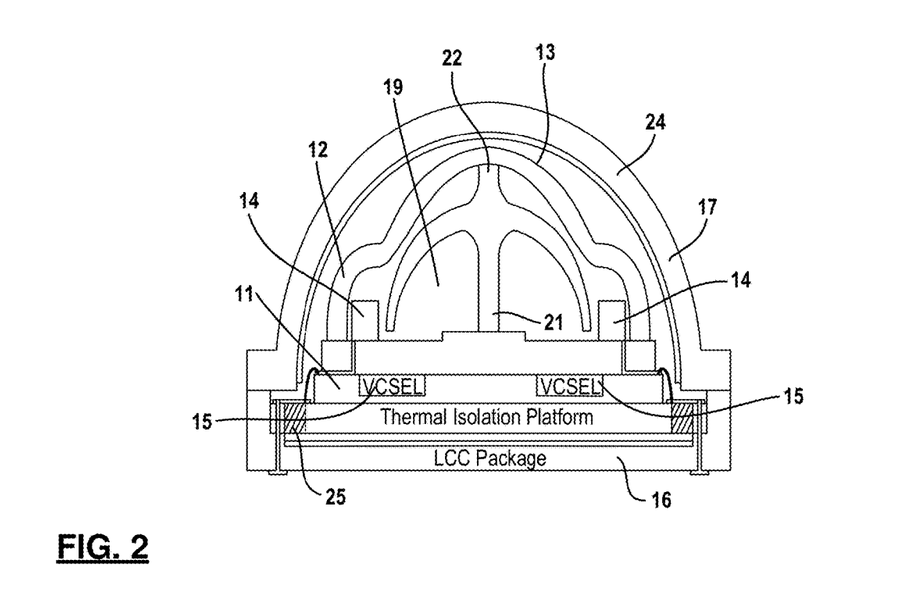
FIG. 2 is a cross sectional side view of an alternative embodiment of a micro RIG.

FIG. 2 depicts an alternative embodiment of a three-dimensional micro shell rate-integrating gyroscope. In this embodiment, the gyroscope 10 is disposed on a platform 16 and the platform 16 is enclosed by an outer shell 17. In this example, the resonator 13 is formed with two stems 21, 22 for attachment. A first stem 21 extends downward from a center of an inner surface of the resonator 13 and attaches to the support substrate 11; whereas, a second stem 22 extends upward from a center of an outer surface of the resonator 13 and attaches to the interior surface of the inner shell 12. Except with respect to the differences discussed herein, the gyroscope 10 is substantially the same as gyroscope described above.

In this embodiment, the platform 16 is thermally isolated from the outer shell 17. The thermally isolated platform 16 keeps the gyroscope 10 at a constant temperature regardless of changes in outside temperature. This technique is called ovenization. Ovenization eliminates drift in bias and scale factor due to changes in external temperature, which are two of the most significant sources of errors for a gyroscope. Ovenization is done by measuring the temperature of the gyroscope using a temperature sensor, comparing the measured temperature to the target temperature, and flowing electrical current through a heater to heat to the gyroscope to the target temperature. In an example embodiment, both the temperature sensor and heater can be made of a thin film metal patterned either on the thermally isolated platform 16 or on the support substrate 11. By having a large suspended area, the thermally isolated platform 16 can have a large thermal resistivity from outside of the sensor. That is, the gyroscope 10 is thermally-insulated from the outside environment. As a result, the gyroscope 10 can be heated fast using a small amount of power.

In the example embodiment, the thermally isolated platform 16 is mounted on top of a leadless chip carrier (LCC) package. The platform 16 may be thermally isolated from the LLC package by multiple supporting beams 25 also called bridges. The beams can have many different forms including straight, folded, circular arc, etc. The beams are designed to have substantially narrower width than the width of the platform in order to have high thermal impedance to reduce the amount of heat conduction between the platform and the LCC package. In combination with the outer shell 17, the LCC package encapsulates gyroscope in another vacuum (e.g., <50 mTorr). The inner surface of the outer shell 17 may be covered with a shield 24 to prevent radiation heat loss. Materials for a radiation shield 24 include but are not limited to gold, aluminum, or silver. The high vacuum and the radiation shield helps the gyroscope to have a large thermal resistance from the outside of the sensor by reducing energy loss through gas conduction and thermal radiation, respectively.

Figure 3A:
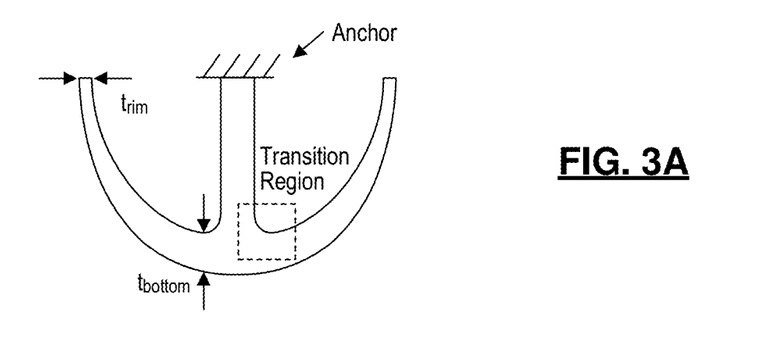
FIGS. 3A-3C are cross sectional views of example resonators which may be used in the micro RIG.
Figure 3B:
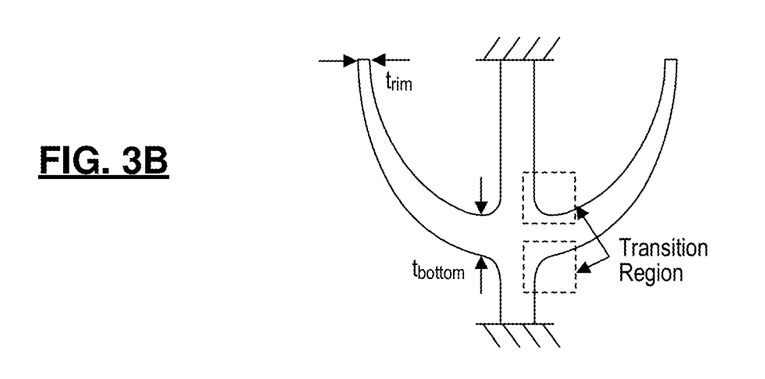
Figure 3C:
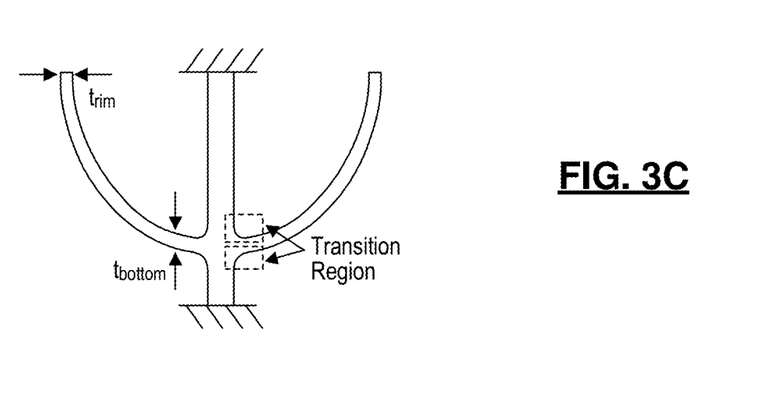

FIGS. 3A-3C illustrate a few example embodiments for the resonator 13. In FIG. 3A, the resonator 13 has a single solid stem, which is joined to an inner surface of the shell of the resonator 13 at its center. The shell's thickness gradually increases from the rim to the bottom of the shell ($t_{rim} < t_{bottom}$) as shown. That is, the resonator 13 has a thickness that increases from a rim of the resonator to the center of the resonator. Of note, the transition region between the shell and the solid stem has a smooth curvature. In some embodiments, the curvature of the transition region is typically but not limited to $1/100$ to $1/2$ of radius of the rim of the shell. This curvature allows the resonator to endure high shock by decreasing stress concentration at the joint between the stem and the shell. In some embodiments, the stem may be formed integral with the shell of the resonator 13.

In FIG. 3B, the resonator 13 has dual solid stems, which are connected to the center parts of both the inner and outer surface of the shell. Again, the shell has a thickness that gradually increases from the rim to the bottom of the shell ($t_{rim} < t_{bottom}$). In FIG. 3C, the resonator 13 has two solid stems, which are joined to the center parts of the both inner and outer surface of the shell. However, the resonator 13 has uniform shell thickness from the rim to the bottom region ($t_{rim} = t_{bottom}$). In both case, the transition region between the shell and the solid stem has a smooth curvature.

Figure 4A:
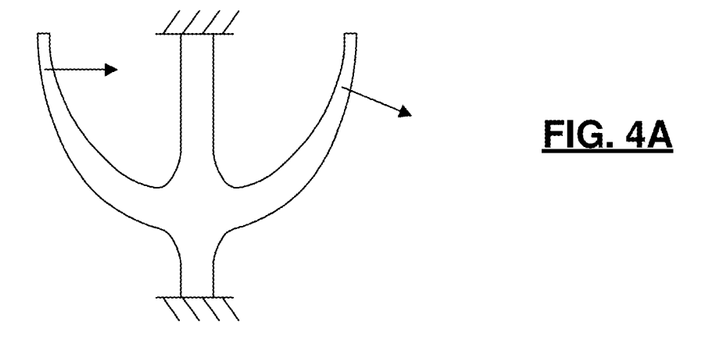
FIGS. 4A-4C are cross sectional views of a resonator illustrating patterns of the tilting, vertical, and wineglass modes, respectively, for the micro RIG.
Figure 4B:
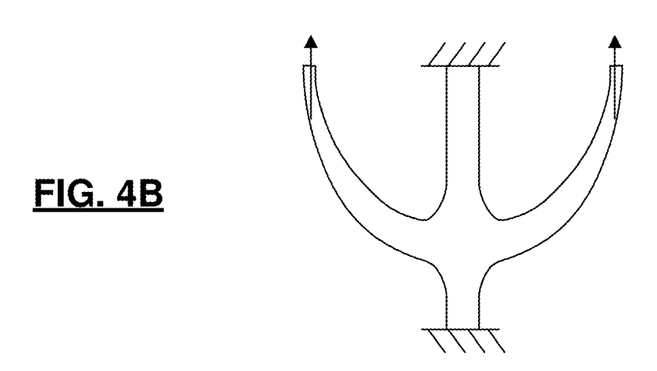
Figure 4C:
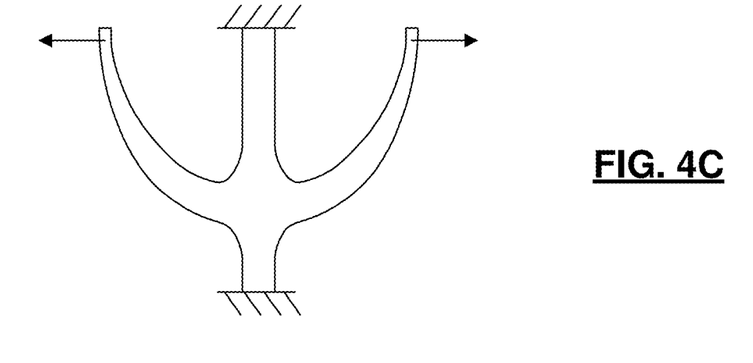

The proposed resonators 13 can have higher vibration and shock insensitivity while having similarly high accuracy as conventional hemispherical resonator gyroscopes. This is because the proposed gyroscopes have higher tilting ($f_{tilting}$) and vertical deflection frequencies ($f_{vertical}$), i.e. higher stiffness for tilting and vertical deflection, and similar $f_{wineglass}$, i.e. similar flexibility for the wineglass mode. The displacement patterns of the tilting, vertical, and wineglass modes are shown in FIGS. 4A, 4B, and 4C, respectively. $f_{tilting}$ and $f_{vertical}$ are determined mostly by the thickness of the shell around the transition region as well as the curvature of the transition region. $f_{wineglass}$ is determined mostly by the thickness of the shell around the rim. Since the proposed resonators have gradually increasing shell thicknesses from the rim to the transition region, they can have higher $f_{tilting}$ and $f_{vertical}$ and similar $f_{wineglass}$ as conventional hemispherical gyroscopes.

Figure 5A:
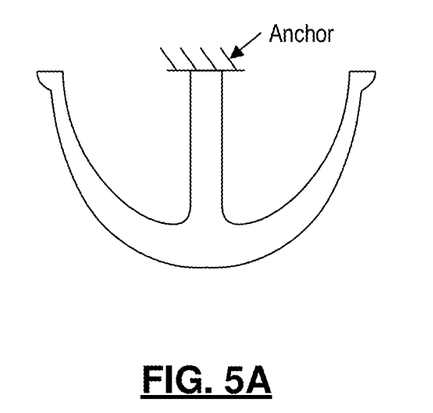
FIGS. 5A and 5B are cross sectional views of a resonator having a thickened rim with a single stem and a double stem, respectively.
Figure 5B:
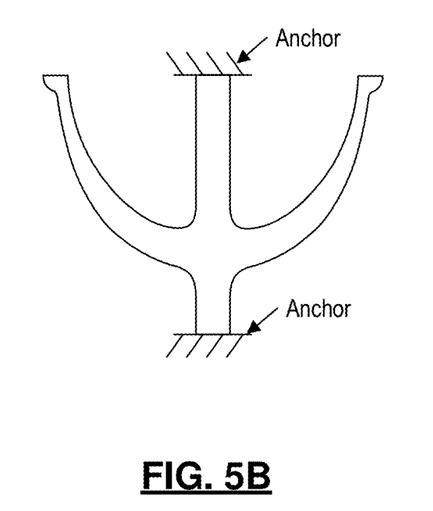

FIGS. 5A and 5B show two example micro shell resonators 13 having thickened rims 51. Both shells have a large local thickness at the rim. However, thickness of the shells rapidly reduces down to a minimum value proximate to the thick region at the rim. Then, the thickness of the shells gradually increases from that minimum value to a maximum value at the transition region (i.e., center of the resonator). Thus, the thickness is at a maximum at the transition region.

Thickened rim increases the effective mass ($M_{eff}$) of the resonator. Effective mass is a key parameter that affects the resolution of a gyroscope, also known as angle random walk (ARW $\propto M_{eff}^{-1/2}$) Angle random walk is proportional to important parameter affecting the resolution of a gyroscope. Thickened rim also increases $f_{wineglass}$, which is not desirable due to the reduction of the scale factor of a gyroscope. However, $f_{wineglass}$ can be controlled to a reasonably low value when the thickness of the shell below the thickened rim is designed to be sufficiently small.

When a micro shell resonator 13 is made from an electrical conductor, there is no need to deposit an electrode layer on top of the micro shell resonator. However, when a micro shell resonator 13 is made from an electrical insulator and when the resonator is driven or sensed capacitively, an electrode has to be patterned on the surface of a resonator. As the coverage area and the thickness of the electrode increases, wineglass modes' Q drop and the anisotropy between the Q and f of the wineglass modes increases. Both of these changes lead to the degradation of the angle random walk and bias stability of a gyroscope.

Figure 6A:
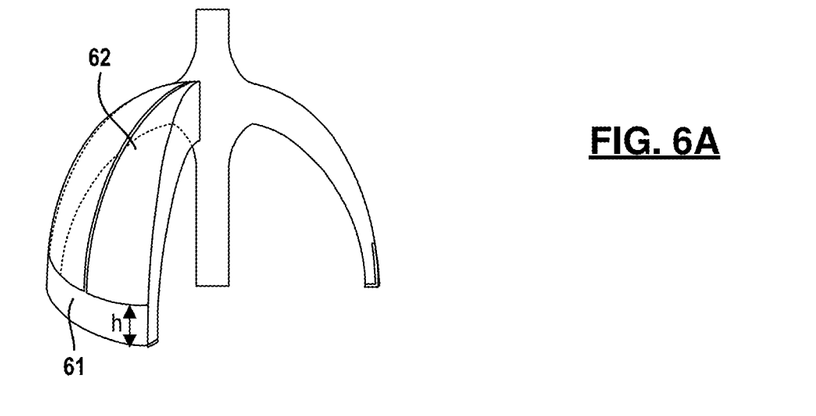
FIGS. 6A-6C are partial perspective view of a resonator with different conductive coatings.
Figure 6B:
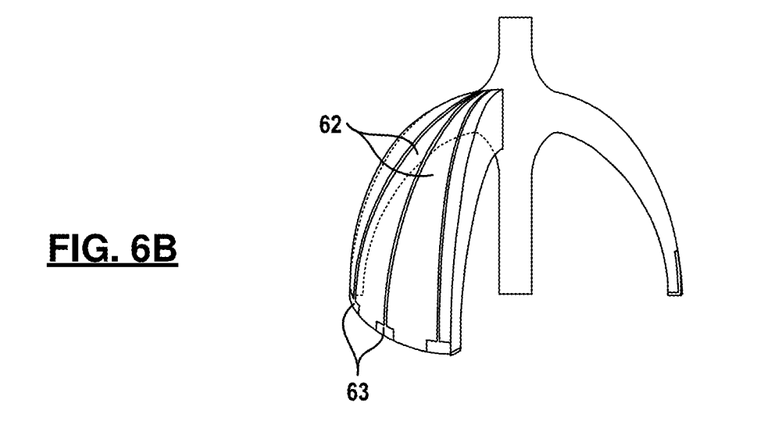
Figure 6C:
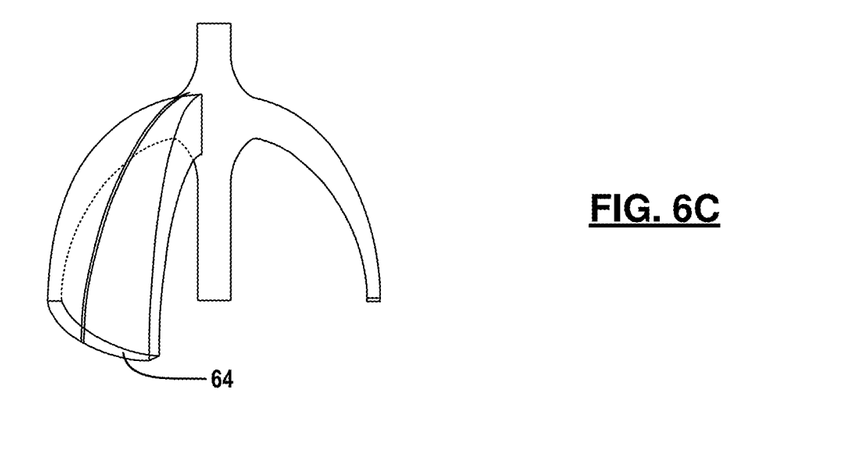

FIGS. 6A-6C depict different electrode patterns that can be used on a resonator 13. A conductive coating is disposed on an exterior surface of the resonator and adjacent to the rim of the resonator. In FIG. 6a, the electrode has a shape of a ring 61 that covers the outer surface of the shell near its rim. The electrical connection to the ring electrode is provided by one more narrow electrical lines 62 patterned from the anchor to the ring 61. In FIG. 6b, the electrode is formed by a plurality of discrete electrodes 63 disposed around a circumference of the resonator 13 and near its rim 51. Each discrete electrode 63 aligns with a corresponding drive electrode. The discrete electrodes 63 are preferably spaced evenly around the resonator 13. The electrical connection to the electrodes 63 is provided by the multiple narrow electrical lines 62 patterned from the anchor to each of the discrete electrodes 63. The electrode patterns in FIGS. 6A and 6B are useful when a resonator 13 is driven using drive electrodes that are located on a side of the resonator 13. In FIG. 6C, a single electrode 64 is patterned on the underside surface of the rim 51. The electrical connection is again provided by one or more narrow electrical lines 62 patterned from the anchor to the electrode. The electrode pattern in FIG. 6C is useful when a resonator 13 is driven using an electrode that is located underneath the rim of the resonator 13. In any case, the electrodes and/or the electrical lines are preferably arranged symmetrically around the center of the resonator 13.

The material for the electrode needs to have low internal energy loss to make the resonator to have high Q. Examples of these materials include but are not limited to highly doped amorphous silicon (deposited using sputtering, plasma enhanced chemical vapor deposition (PECVD) or low pressure chemical vapor deposition (LPCVD)), tin oxide (sputtered), and platinum (deposited using sputtering or atomic layer deposition (ALD)). Other types of materials and deposit techniques are contemplated by this disclosure.

Gyroscopes calculate rotation rates and angles by detecting the changes in the standing wave patterns caused by the Coriolis force. The amount of change in the standing wave's amplitude is proportional to a rotation rate. For a micro shell resonator gyroscope to detect very low rotation rate ($<10^{-3}$ deg/h), an amplitude change of a fraction of a picometer needs to be detected. Detection of such a small amplitude change is very challenging with existing measurement techniques. To address this challenge, a compact, ultra-high shock resistant optical motion measurement system is presented for a gyroscope, capable of detecting sub-picometer amplitude change.

Figure 7:
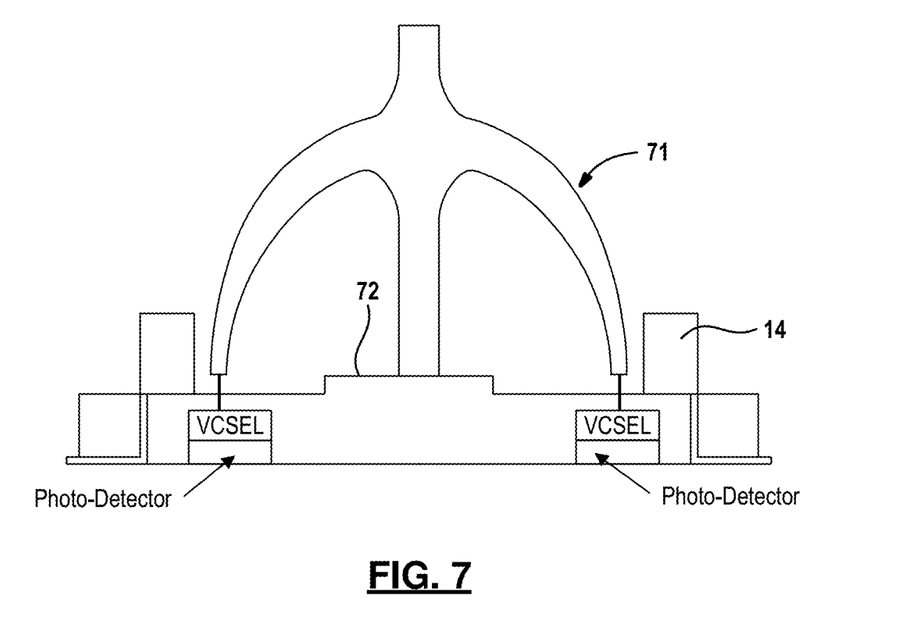
FIG. 7 is a cross section view illustrating an optical sensing methods integrated into the micro RIG.

FIG. 7 shows how an optical detection system 70 can be integrated into the gyroscope 10. In this example embodiment, a micro shell resonator 71 is mounted face down on a transparent substrate 72. A single-mode laser diode, such as a vertical-cavity surface emitting laser (VCSEL), and a photodetector are mounted inside the recesses defined on the bottom surface of the support substrate 72. These devices are placed underneath the perimeter of the resonator's rim at equal angles.

The optical detection system 70 utilizes the optical feedback interferometry (FI) principle. Feedback interferometry, also called self-mixing or injection interferometry, can measure a target's displacement, velocity, and the distance between the laser source and the target based on the interactions of laser beams that travel in two different optical cavities. The first optical cavity is a Fabry-Perot cavity of a laser diode, and the second optical cavity is between the laser diode and the target, that is, the rim of the resonator. As the laser beam that reflects off from the rim enters the first optical cavity, the two beams make optical interference. This causes the characteristic (intensity, frequency, phase) of laser beam to change. The characteristics of the laser beam are measured using a photo detector at the bottom of the laser source.

Feedback interferometry has several attractive features. First, laser diodes and photodetectors do not need to be placed at a close distance to the rim. This is not the case for the capacitive measurement technique, because a capacitance has an inversely proportional relationship with the distance between the rim and the electrode. Placing a readout electrode at a close distance from the rim is challenging because the microfabrication process becomes complicated and gyro performance degrades after high shock event due to potential collisions between the resonator and the electrode. Second, compared to other interferometry techniques, such as Michelson, Mach-Zehner, and Sagnac interferometry, FI requires a simple setup because it does not require an external optical interferometer. Therefore, an FI setup requires a far smaller volume and is more stable against shock and vibration than other methods. The size of a VCSEL is quite small; for example, relevant commercially available devices from Princeton Optronics Inc. are only 250×250×110 µm$^3$. Third, FI only requires a laser diode with an integrated photodetector and optionally a lens. It does not require precise alignment or filtering, as the laser naturally filters out the relevant spatial mode. Fourth, FI provide very sensitive measurement, as the detected signal is always in the quantum regime (except for a small reflectivity loss at the laser diode entrance mirror) and the quantum-limited signal-to-noise ratio is attainable. Fifth, commercially available VCSEL has high wavelength stability, so the motion detection accuracy is very high. For example, the 0.7 mW, 680 nm True Single-Mode VCSEL (PN: 680S-0000-X003) from Vixar has a wavelength temperature coefficient of 0.045 nm/° C. and has the option for an integrated thermoelectric cooler that brings the λ tolerance down to ±10 pm. The wavelength can be further stabilized by ovenizing the device with very high accuracy or locking the laser output to the absorption line of a rubidium vapor cell. Sixth, FI consumes low energy. Driving eight VCSELs for gyro motion sensing requires typically requires power less than 10 mW. While reference has been made to a particular optical detection system, this is merely one aspect of the gyroscope design such that other aspects of this disclosure are applicable to gyroscopes that employ other types of resonator motion detection systems.

Turning to FIGS. 8A-8G, an example method for fabricating the three-dimensional micro shell rate-integrating gyroscope 10 is described in more detail. Fabrication can begin with the hemispherical resonator 13. The materials for the resonator 13 may include but not limited to borosilicate glass, borofloat glass, aluminosilicate glass, ultra-low expansion glass, fused silica, sapphire, ruby, silicon carbide, quartz, and alumina. In one embodiment, the resonator 13 has a radius, height, and anchor dimensions from 100 s µm to a few cm. The resonator 13 has a solid anchor post (to provide shock resistance), and a thickness gradient in the shell wall (to provide vibration resistance), which is thickest in the center and thins down to furthest from the anchor except for the rim as described above. In the example embodiment, the thickness of the shell is on the order of 10 s µm to 100 s µm. As described above, the rim 51 of the resonator 13 can be optionally thickened to increase effective mass.

Figure 8A:
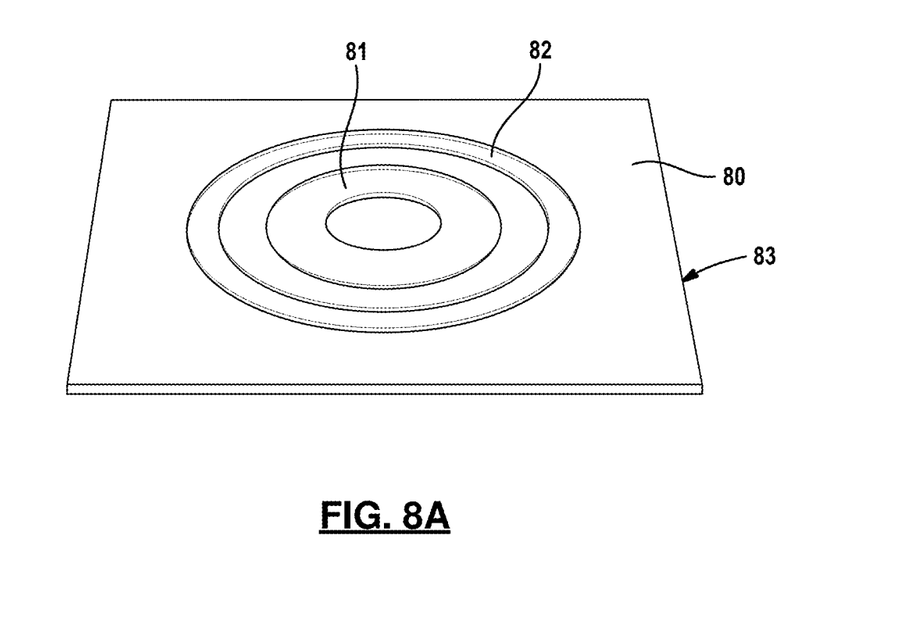
FIGS. 8A-8G are diagrams depicting an example method for fabricating the micro RIG.

First, the resonator 13 is fabricated from a thermally reflowable material using a modified blowtorch molding process. An annulus is formed on a surface of a substantially planar reflow material 80 as seen in FIG. 8A. In this example, two concentric annulus 81, 82 are formed in the reflow material 80. The inner annulus 81 is sized such that it will form the thickened rim after molding while the outer annulus 82 aligns with the edge of the mold to ensure the inner annulus is centered. Another option is to place a separate annulus into the bottom of the mold such that the reflowing shell will fuse to it at predefined depth and radius. The fused silica shell may be annealed to relax residual stresses, which has been shown to improve Q.

Figure 8B:
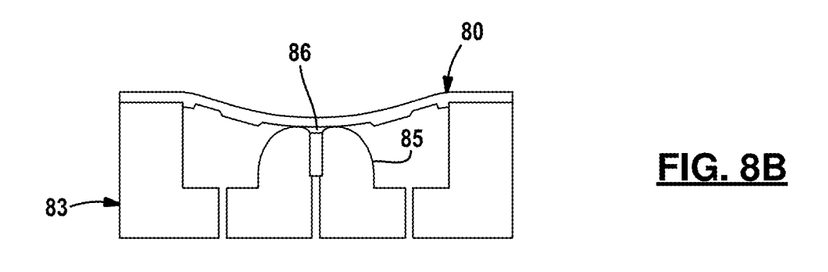

In FIG. 8B, the reflow material 80 is disposed onto a mold 83. The mold has a cylindrical recess 84 formed therein and the reflow material encloses the recess 84. The sidewall of the recess does not have to be perpendicular. Angled or curved sidewalls are also envisioned. The mold further includes a protrusion 85 projecting upward from a bottom surface of the recess and positioned at center of the bottom surface of the recess. The reflow material 80 is preferably reflowed at a temperature above the softening temperature of the reflow material. The reflow material 80 touches and fuses to the solid post 86 mounted inside a cylindrical hole formed in a center of the protrusion.

Figure 8C:
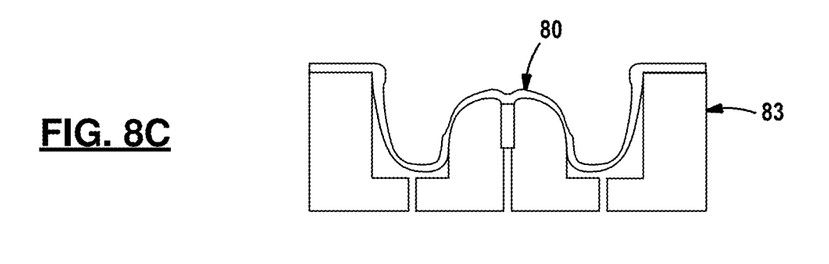

While the reflow material is disposed on the mold, the reflow material is heated. With reference to FIG. 8C, the reflow material reflows towards the bottom surface of the recess of the mold, for example with the help of a pressure gradient created across the reflow material. The solid anchor post 86 that is recessed below the top of its surrounding dome, causes the reflow material to flow down and form a smooth, rounded junction with the post 86. This reduces stress concentration at that junction, making the resonator more robust in harsh dynamic environments. Further details regarding this reflow process can be found in an article by J. Cho et al's entitled "A high-Q all-fused silica solid-stem wineglass hemispherical resonator formed using micro blow torching and welding" In Proc. MEMS 2015, pp 821-824 (January 2015) which is incorporated herein in its entirety by reference.

Figure 8D:
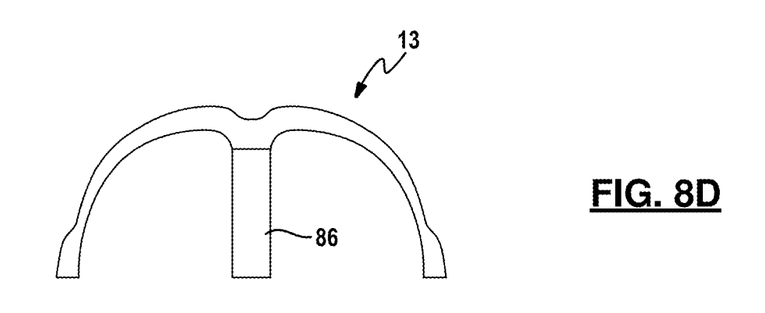

The resonator 13 is released from the mold as seen in FIG. 8D. The resonator 13 is polished through lapping and chemical-mechanical polishing, and then selectively coated with a thin conductive layer using shadow masking. Metal grain slippage during mechanical deflection is a source of energy loss, so minimizing metal coverage should help maximize Q. A thin metal will be selectively coated on the inside of the shell so that a bias connection can be made to the anchor post. For a vertical drive scheme, additional metal need only be deposited on the polished rim, but not on the outside of the resonator. For lateral drive, the metal must continue to the outer part of the shell that is parallel to the electrodes. Another option is atomic layer deposition of metal onto the entire exterior surface of the shell, which has several advantages over physical vapor deposition (PVD) that help to increase Q. PVD is non-conformal due to line of sight deposition, creating stress gradients over temperature that degrade Q. It also tends to form metallic grains, which limits the minimum thickness required for a conductive film. Slippage between grains due to mechanical deflection also results in energy loss. Atomic layer deposition can provide thinner, more uniform metal coatings, helping to maximize Q.

Figure 8E:
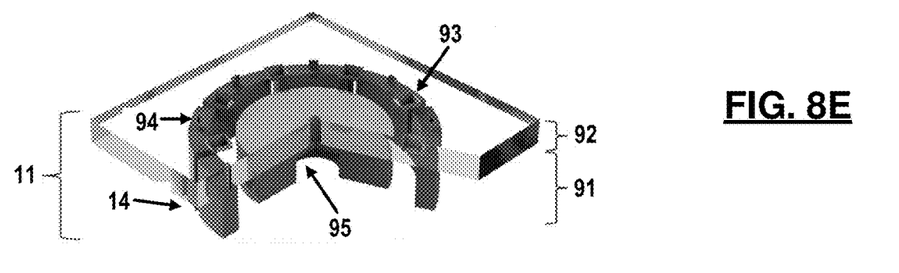

Next, the support substrate 11 for the gyroscope 10 is fabricated. In the example embodiment, the support substrate 11 includes a top substrate 91 and a bottom substrate 92 as seen in FIG. 8E. The top substrate 91 is typically made by bonding and patterning an electrical semiconductor (e.g., silicon) or patterning an insulator (e.g., fused silica) and coating the sidewalls of the patterned features with an electrical conductor (e.g., gold or titanium); whereas, the bottom substrate 92 is made from an optically transparent, electrical insulating material (e.g., glass or fused silica). On the bottom substrate, an anchor attachment point, multiple drive electrodes, electrical feedthroughs 94, and cavities 93 to contain the eight VCSELs for optical readout are defined, for example by wet etching, dry etching, sandblasting, milling and drilling. The bottom substrate 92 is then bonded to the top substrate 91. In the center of top substrate 91, a hole 96 is etched that serves as the seat for the solid anchor post 86. A small amount of the material is left under the anchor to ensure the rim, which is level with the anchor post, does not touch the substrate. A circular trench etched down to the glass around the anchor seat electrically isolates the shell. For a lateral drive scheme, thick drive electrodes 14 are fabricated concentric to the outside of the shell rim with gap for example smaller than <100 µm gap, while for a vertical drive scheme, thin electrodes are fabricated to align with the polished rim, at a distance of <100 µm from its surface.

Figure 8F:
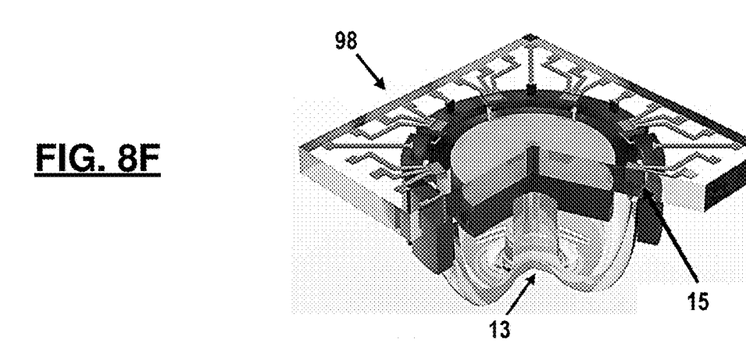

To make electrical connections to the electrostatic drive electrodes 14, deep trenches are etched through the glass side to reach the bottom of the electrodes, thus maintaining a hermetic seal. The trenches are then refilled with metal by electroplating. Square holes are etched into the glass in a circular pattern opposite the rim to form cavities for the VCSELs, which are aimed through the glass at the polished rim of the resonator. If necessary, a commercial microlens and appropriate spacer may be placed in the holes below the VCSELs to control beam divergence. VCSELs will be embedded in a polymer, such as Parylene, to fix their position and provide some mechanical protection. Metal traces 98 are patterned on the glass side to contact the drive electrodes 14 and the VCSELs 15 as seen in FIG. 8F.

Figure 8G:
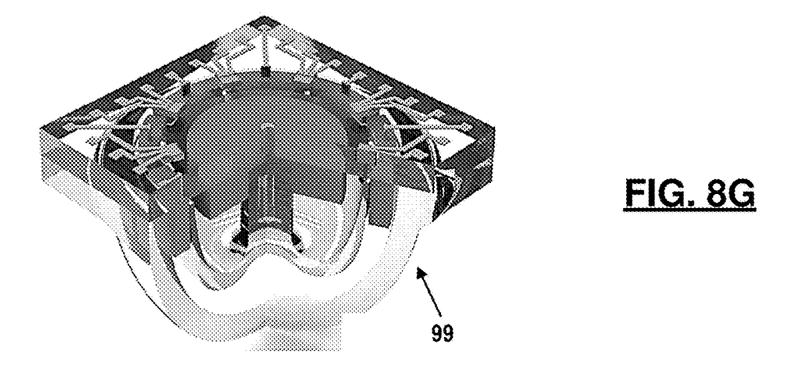

A lid 99 will be thermally molded to fit over the resonator 13 and its electrodes as shown in FIG. 8G. If desired, this could incorporate a second anchor to secure the shell resonator. The dome may be attached with glass frit, laser welding, or silicate bonding. While the above fabrication method has been described with specific components having specific values and arranged in a specific configuration, it will be appreciated that this method may be implemented with many different configurations, components, and/or values as necessary or desired for a particular application. The above configurations, components and values are presented only to describe one particular embodiment that has proven effective and should be viewed as illustrating, rather than limiting, the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gyroscope, comprising:
a support substrate;
an inner shell attached to the substrate and defining an inner cavity between an interior surface of the inner shell and a top surface of the support substrate;
a hollow hemispherical resonator having an inner concave surface facing the support substrate, the resonator disposed in the inner cavity and mounted above the top surface of the support substrate, wherein the resonator has a thickness with a minimum value proximate to a rim of the resonator, where thickness of the resonator increases from the minimum value to a maximum value at the center of the resonator;
a first stem integral with the resonator and extending from a center of the inner surface of the resonator to the support substrate;
two or more driving electrodes formed on the support substrate and arranged around periphery of the resonator, wherein the two or more driving electrodes are configured to drive the resonator electrostatically; and
a plurality of optical sensors encapsulated within the support substrate, wherein each optical sensor is configured to detect motion of the resonator, wherein the optical sensors are arranged adjacent to the periphery of the resonator and positioned underneath a rim of the resonator.

2. The gyroscope of claim 1 wherein the resonator has a second integral stem extending from a center of an outer surface of the resonator and attaches to the interior surface of the inner shell.

3. The gyroscope of claim 1, wherein the rim of the resonator has a thickness larger than the minimum value.

4. The gyroscope of claim 1 wherein the resonator has a conductive coating disposed on an exterior surface thereof and adjacent to the rim of the resonator.

5. The gyroscope of claim 4 wherein the conductive coating is patterned as a ring on the exterior surface and proximate to the rim of the resonator.

6. The gyroscope of claim 4 wherein the conductive coating is patterned as a plurality of discrete electrodes disposed around a circumference of the resonator and proximate to the rim of the resonator, where each the plurality of discrete electrodes aligns with one of the two or more driving electrodes.

7. The gyroscope of claim 1 wherein the optical sensors include vertical-cavity surface-emitting lasers.

8. A system comprising:
the gyroscope of claim 1;
a platform; and
an outer shell, where the platform is enclosed by the outer shell, and the platform is thermally isolated from the outer shell.

9. A resonator, comprising:
a support substrate;
an inner shell attached to the substrate and defining an inner cavity between an interior surface of the inner shell and a top surface of the support substrate;
a hollow hemispherical resonating member having an inner concave surface facing the support substrate, the resonating member disposed in the inner cavity and mounted above the top surface of the support substrate, the resonating member has a first integral stem extending from a center of the inner surface of the resonating member and attaches to support substrate, wherein the resonating member has a thickness with a minimum value proximate to a rim of the resonator, where thickness of the resonator increases from the minimum value to a maximum value at the center of the resonator;
two or more driving electrodes formed on the support substrate and arranged around periphery of the resonating member, wherein the two or more driving electrodes are configured to drive the resonating member electrostatically; and
a plurality of optical sensors encapsulated within the support substrate, wherein each optical sensor is configured to detect motion of the resonating member, wherein the optical sensors are arranged around the periphery of the resonating member and positioned underneath the rim of the resonating member.

10. The resonator of claim 9 wherein the resonating member has a second integral stem extending from a center of an outer surface of the resonating member and attaches to the interior surface of the inner shell.

11. The resonator of claim 9, wherein the rim of the resonator has a thickness larger than the minimum value.

12. The resonator of claim 9 wherein the resonating member has a conductive coating disposed on an exterior surface thereof and adjacent to the rim of the resonating member.

13. The resonator of claim 12 wherein the conductive coating is patterned as a ring on the exterior surface and proximate to the rim of the resonator.

14. The resonator of claim 12 wherein the conductive coating is patterned as a plurality of discrete electrodes disposed around a circumference of the resonating member and proximate to the rim of the resonating member, where each of the plurality of discrete electrodes aligns with one of the two or more driving electrodes.

15. The resonator of claim 9 wherein the optical sensors include vertical-cavity surface-emitting lasers.

* * * * *

UNITED STATES PATENT AND TRADEMARK OFFICE
CERTIFICATE OF CORRECTION

PATENT NO. : 10,532,943 B2
APPLICATION NO. : 15/444450
DATED : January 14, 2020
INVENTOR(S) : Khalil Najafi et al.

It is certified that error appears in the above-identified patent and that said Letters Patent is hereby corrected as shown below:

In the Specification

Column 1, Line number 10, prior to section "Field," insert heading --Government Support-- therefor.
Column 1, Line number 11, after heading "Government Support," insert --This invention was made with government support under N66001-16-1-4029 awarded by the U.S. Department of Defense, Defense Advanced Research Projects Agency. The government has certain rights in the invention.-- therefor.

Signed and Sealed this
Twenty-first Day of March, 2023

Katherine Kelly Vidal
*Director of the United States Patent and Trademark Office*